Nov. 20, 1934.   G. RAMSEY   1,981,069
COORDINATION OF MOVING PICTURES AND SOUND RECORDS
Filed July 8, 1929   4 Sheets-Sheet 1

George Ramsey
INVENTOR

Nov. 20, 1934.　　　　　G. RAMSEY　　　　　1,981,069
COORDINATION OF MOVING PICTURES AND SOUND RECORDS
Filed July 8, 1929　　　4 Sheets-Sheet 2

George Ramsey
INVENTOR

Nov. 20, 1934.　　　　　G. RAMSEY　　　　　1,981,069
COORDINATION OF MOVING PICTURES AND SOUND RECORDS
Filed July 8, 1929　　　4 Sheets-Sheet 4

Patented Nov. 20, 1934

1,981,069

UNITED STATES PATENT OFFICE 1,981,069

COORDINATION OF MOVING PICTURES AND SOUND RECORDS

George Ramsey, Brooklyn, N. Y.

Application July 8, 1929, Serial No. 376,713

9 Claims. (Cl. 88—16.2)

The present invention relates to the coordination between moving pictures and sound reproduction.

When an event or scene is recorded both as to moving pictures and as to sounds, it is desirable that the sound reproduction and the pictures be properly coordinated in order to produce a natural result to the auditor. In close-up pictures, or enlarged views, it is desirable that the sound shall bear such relation to the picture that when the picture and the sound are reproduced, it will produce an effect as though the observer were near to the object, and conversely where the object is a substantial distance away, the visualization of the picture and the sound reproduction should be separated sufficiently to produce a natural result to the auditor.

The instruments for producing the best picture results and the best sound records cannot always be maintained in a definite relation, and, therefore, the projected picture and reproduced sound have not always been recorded and reproduced in the prior art in the proper relationship, since sound waves travel at an extremely low rate of speed as compared to light. For example, where a telephoto lens is used on the camera to produce a close-up effect and the microphone for the sound recording apparatus is set at a proper position some distance away to produce the desired tonal effects, when reproduction occurs, the lips of a speaker may be slightly out of phase with the sound, that is, the observer will notice the lip movements which slightly precede the pronounciation of the words of the actor. This is particularly true where scenes are taken of public events which occur outside of studios and where the operators for the sound and picture machines are not able to adjust their instruments with studio precision. A photographic record may be made by telephoto lens from some distance away, but the sound reproduction from the same distance is so badly out of synchronism that it is very often necessary to induce sounds artificially after the moving picture has been made.

The inventions hereinafter explained in detail, and herein claimed overcome the above specified difficulties by making corrected records from original records that are out of synchronism.

The disclosure herewith, as to the drawings, is diagrammatic of the preferred forms of the invention which, however, may be carried out by steps and apparatus differing from the present disclosures without departing from the scope of the inventions.

Fig. 1 is a diagrammatic view illustrating an apparatus for correcting synchronism between sound and pictures, both recorded on the film, during the printing of duplicate films.

Fig. 2 diagrammatically discloses an apparatus for determining and making a record of the correction needed in reproducing a corrected film of a combined sound and picture record.

Fig. 3 diagrammatically illustrates a portion of the correction printer shown in Fig. 1, constructed to be operated according to the chart made on the device shown in Fig. 2.

Figure 1:
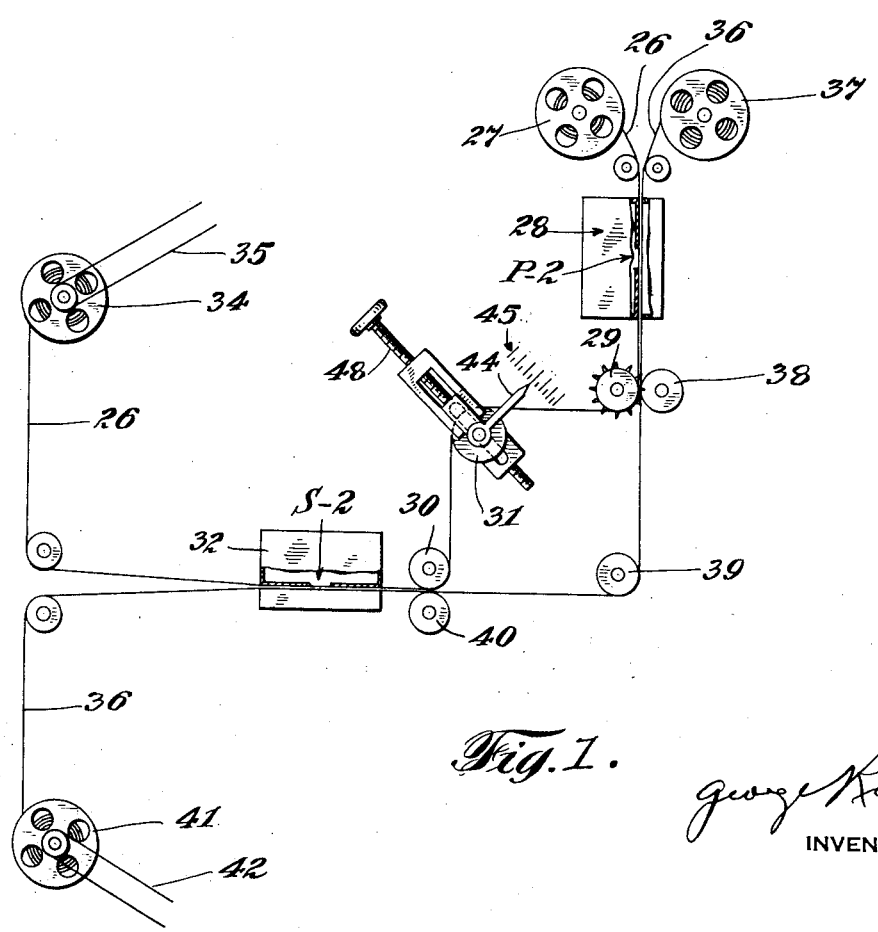

Referring to the drawings and more specifically to Fig. 1, which illustrates a film printing apparatus, a negative film 26 comprising a combined record of pictures and sound, is fed from a supply roll 27 through a picture printer 28, which exposes only the picture portion of the film and leaves a sufficient amount at the side thereof unexposed to take the record of sound. This negative film is fed past the suitable rolls 29 and 30 with a movable guide roll 31 located between the rolls 29 and 30. The roll 29 comprises a feed roll having teeth, while the rolls 30 and 31 are smooth. After the negative film passes over the rolls 29 and 30, it passes through a sound printer 32 and then is carried through suitable guides to a take-up roll 34, preferably driven by a friction slip belt 35 to keep the negative film taut between the take-up roll 34 and the feed sprocket 29.

The positive film 36 on which the print is being made is carried from a suitable supply roll 37 past the picture printer 28 where the pictures from the negative 26 are printed on the positive film 36 and then the positive film is carried over guide rolls 38, 39, and 40, then past the sound printer 32 where the sound record is printed on the side of the positive film beside the pictures. The positive film 36 is then carried through suitable guides to take-up roll 41, which likewise preferably is driven by a friction slip belt 42, to keep the film 36 taut between the feed sprocket 29 and the take-up roll 41. It is to be understood that the feed sprocket 29 has teeth of sufficient length to control the feed of both the negative film 26 and the positive film 36.

It will be observed that the negative film 26 makes a substantial right angle turn over the movable roll 31 and the positive film 36 makes a substantial right angle turn over the roll 39. By moving the movable roll 31, the length of negative film between the picture printing area P—2 and the sound printing station S—2 may be either lengthened or shortened. The length of positive film 36 between the picture printing station P—2 to the sound printing station S—2 is maintained constant at the predetermined standard length, which is the length between the field of the projection lens and the sound pick-up in the standard exhibitional projector and reproducer. The final record on the positive film 36 may have a different distance between the picture printed at P—2 and the sound record corresponding thereto printed at S—2, as compared to the distance between the corresponding sound record and picture on the negative 26. In this way, pictures on the positive film and the sound corresponding to these pictures may be correctly printed in synchronism where there was an error or undesirable relation between the two zones on the negative as taken. The movable guide roll 31 is provided with an indicator 44 which may cooperate with the scale 45. The adjustable roll 31 is mounted to be moved in slots diagonal of the rhomboid formed by the films 26 and 36 and may be adjusted through the medium of an adjusting screw 48, or other suitable apparatus for causing the proper adjustments to this roll. Various other mechanisms may be utilized to obtain a predetermined differential relative length of the films 26 and 36 between the picture printing point P—3 and the sound printing point S—3.

Figure 2:
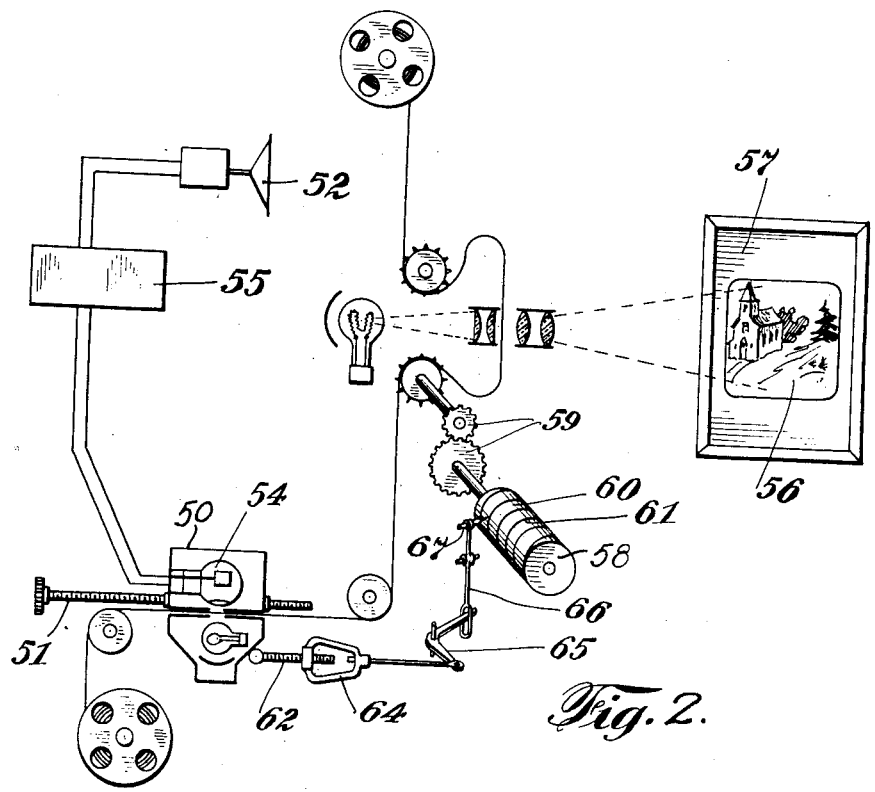
Figure 3:
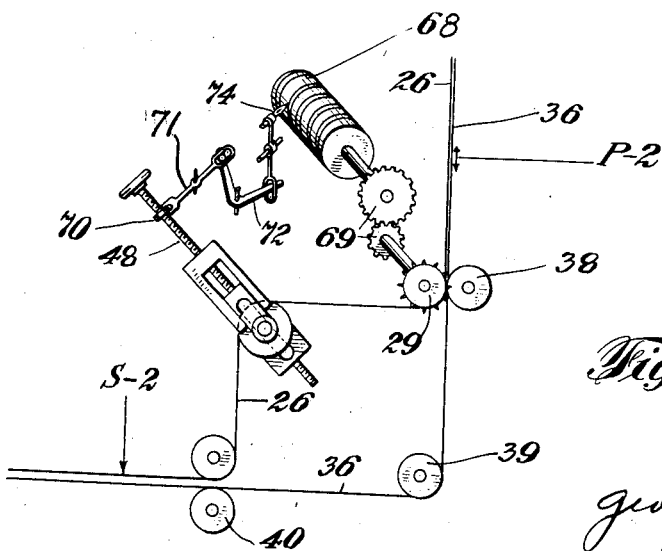

Figs. 2 and 3 illustrate diagrammatically an apparatus by which lack of synchronism between the sound record and picture record may be determined and recorded, and then corrected on a standard print from the uncorrected film. In these illustrations only such features as are essential to the disclosure of the present invention are illustrated and the parts omitted are well known in the art and are omitted for the sake of clarity. Fig. 2 represents a projecting machine provided with a photoelectric sound pick-up connected to a suitable sound reproducer so that a film may be run through the machine and the operator may observe the synchronism or lack of synchronism between the picture record and the sound record. The pick-up mechanism 50 is adapted to be moved by a hand screw or other suitable device 51 until the sounds produced by the loud speaker 52 operatively connected with a photoelectric cell 54 of the pick-up through suitable amplifiers 55, correctly synchronizes with the picture 56 being projected on the screen 57. A drum 58 is operatively connected with a feed sprocket of the projector, preferably through reduction gears 59, in such manner that the drum rotates at a predetermined speed relative to the run of the film through the projector. This drum preferably carries a sheet of paper or chart 60 on which is preferably marked a line 61 representing the normal synchronization line. A link 62 connected with the pick-up 50 is provided with a turnbuckle 64 whereby the length of the link 62 may be lengthened or shortened and this link is connected with a bell-crank 65 that cooperates with a lever 66, the upper end of which carries a marker 67, which may comprise an ink pen or the like.

The operator projects the picture 56 on the screen and listens to the sound record through the loud speaker 52. If the synchronization is correct the marker 67 will follow the line 61 of the chart 60 on the drum 58. If the sound does not synchronize with the projected picture then the operator moves the pick-up 50 backward or forward by means of the screw 51 until synchronization occurs. This movement of the pick-up causes a corresponding lateral movement of the marker 67 so that it traces a line on one side or the other of the standard line 61. After the uncorrected positive film has been run through the projector the negative of the film is placed in the printer shown in Fig. 1, as modified by Fig. 3. This printer is modified, as shown in Fig. 3 by connecting a drum 68 through reduction gears 69 to a feed sprocket 29 of the printer. The drum 68 and the reduction gears 69 exactly correspond to the drum 58 and the reduction gears 59 on the projector, shown in Fig. 2, so that as the negative film runs through the printer the chart 60, which has now been placed on the drum 68, bears the same rotative relation to the negative film that the positive from this negative did to the drum 58 when the positive film was run through the projector. The screw 48 of the printer is provided with a collar 70 which runs between the forked end of a lever 71 which is connected by bell crank 72 with a pointer 74. As the films 26 and 36 run through the printer the operator adjusts the adjustment screw 48 in such manner as to cause the pointer 74 to follow the line traced by the marker 67 on the chart 60 and in this way the operator maintains the length of the negative film between the picture printing point P—2 and the sound printing point S—2 so spaced apart as to cause correct synchronism of a projected picture and a reproduced sound when the new positive film being printed is developed and is run through a standard reproducing and projecting machine.

Figure 4:
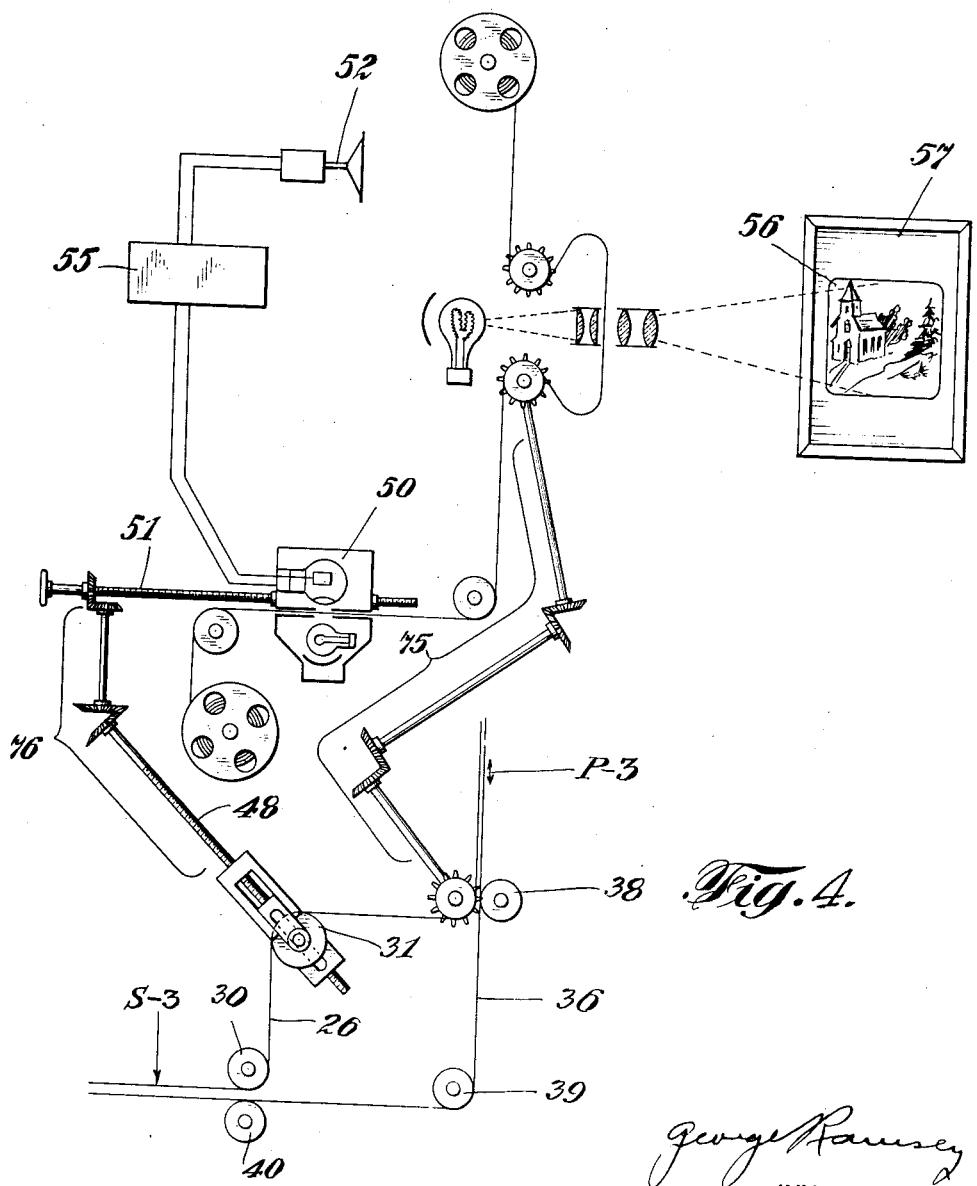
Fig. 4 illustrates diagrammatically apparatus for determining errors in synchronism between a sound record and picture record on a single film, and correcting the errors in printing a new film.

Referring now to Fig. 4, which diagrammatically illustrates a projector and a printer mechanically connected together, the projector and sound reproducer are the same as illustrated in Fig. 2, and the printer is the same as illustrated in Fig. 1, with the exception that a drive sprocket of the projector is connected by suitable gears and shafts 75 to a drive sprocket on the printer so that the projector and printer run at exactly the same speed. The screw 51 of the sound pick-up on the projector is connected through suitable shafting and gears 76 with the adjustment screw 48 on the printer so that an adjustment of the electric pick-up to secure correct synchronism between the picture 56 and the reproduced sound automatically adjusts the screw 48 on the printer, thereby maintaining the printing point P—3 of the negative for the picture properly spaced from the printing point S—3 of the negative for the sound record, so that the operator making the adjustments while listening to the sound reproduction and observing the projecting of the picture from an uncorrected positive film run through the projector, maintains proper synchronization between the original unsynchronized negative and new positive film in the printer. It is to be clearly understood that the connections between the projector and the printer as illustrated in Fig. 4 are diagrammatic and that the connections may be mechanical, electrical, or any other suitable connecting medium whereby the printer and the projector are operated simultaneously and the adjustments to secure synchronization of reproduced sound by the projector automatically produces the correct adjustment between the new positive and the negative in the printer.

Figure 5:
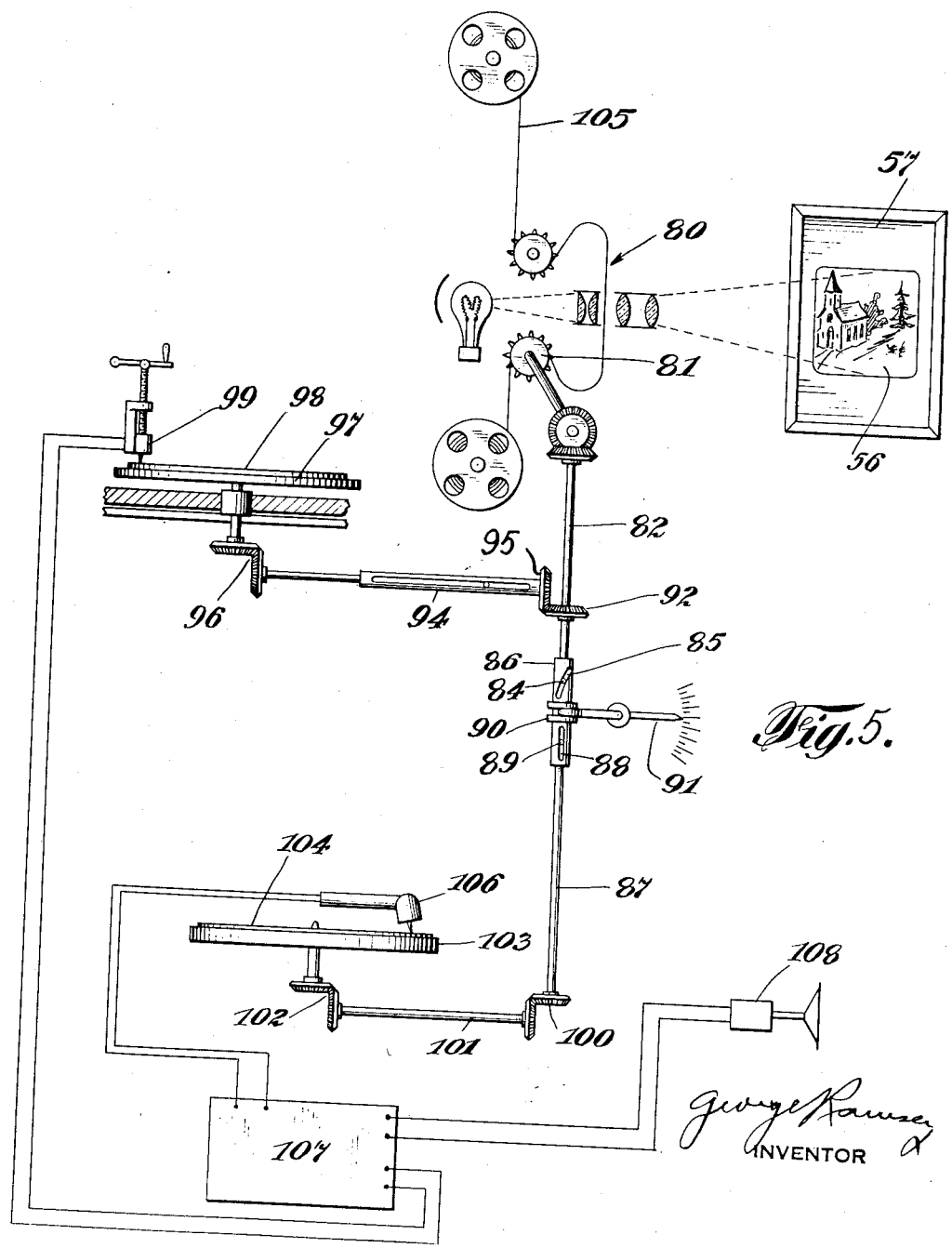
Fig. 5 shows diagrammatically an apparatus for correcting errors in synchronism between a picture film and a separate sound record.

Referring now more especially to Fig. 5, which discloses an apparatus for recording moving pictures on a film and the sound record on a separate member such as a phonograph record, and reproducing a new phonograph record which will be properly synchronized with the film. In other words, the apparatus disclosed in Fig. 5 is analogous to that shown in Fig. 4, which is adapted for a condition where the sound and picture records are on a film, while the apparatus of Fig. 5 is adapted for the condition where the two records are separate, one on the film and the other on a phonograph record.

Referring now more especially to the details shown in Fig. 5, a projector 80 has one feed sprocket 81 connected with a driven shaft 82 which carries a pin 84 slidable in a helical or inclined slot 85 and a slidable sleeve 86. The lower end of the sleeve 86 telescopes over the shaft 87 and is connected thereto by a straight slot 88 and a pin 89 carried by a shaft 87. This sleeve 86 is provided with a collar 90 in which an adjustment lever 91 is adapted to fit so that the collar may be adjusted over the shafts 82 and 87 and, because of the pin and slot connections, the rotative relation of these shafts may be changed. It is to be understood that other types of adjustments such as differential gear type, well known in the art, may be utilized in the place of the sliding sleeve pin and slot connection. The purpose is to provide an adjustable connection between the shafts 82 and 87 so that the rotative relation of these shafts may be changed while the shafts are rotating. A gear 92 on the shaft 82 is connected with the telescoping shaft 94 by a gear 95, and the other end of the telescoping shaft is connected by gears 96 with a record turntable 97 which carries the usual well known type of wax record 98 adapted to receive a groove formed by a recording cutter head 99. The purpose of the telescoping shaft 94 being to permit the recording head to be held stationary while the wax record is movable thereunder as is common in the art. This recording apparatus is of the type well known in the art and does not, therefore, require detailed explanation. The shaft 87 is connected by gears 100 with a cross shaft 101 which, through gears 102, drive a record turntable 103 on which is placed an original phonograph record 104, which corresponds to, but is recorded out of synchronism with, the picture on the film 105 in the projector 80. An electric pick-up 106 is mounted to cooperate with record 104 in a manner common in the art and this pick-up is operatively connected through an amplifying unit 107 with a sound reproducer 108. The pick-up circuit is also operatively connected with the recording cutter 99, so that as the pick-up functions to operate the sound reproducer, it also operates the record cutter 99, thereby making a corrected new record.

The operation of the device shown in Fig. 5 is as follows: The operator threads the film 105 through the projector and sets the pick-up 106 to the record 104 as nearly in synchronous relation to the projected picture as possible. The machines are started and the operator moves the adjustment lever 91 to produce and maintain proper synchronism between the phonograph record 104 and the picture being exhibited through projector 80. The wax record 98, being operatively connected with the projector, is driven at a constant rotative speed relative to the movement of the film through the projector and is not affected in its rotative movement by the adjustment of the sliding collar 86, which enables the operator to bring the phonograph record into synchronism with the film. Therefore, it will be observed that adjustments made between the film and the phonograph record are automatically introduced into a constant speed wax record which is being cut by the recording cutter 99, the result being that all variations in synchronism between the original record, namely the original phonograph record and the original film, or an uncorrected positive therefrom, are automatically introduced into a new wax record which is being rotated at a constant speed. When the corrected wax record is used to reproduce corrected exhibitional phonograph records, these corrected phonograph records may be used with duplicate films corresponding to the one exhibited during the correction step, then such films are run through standard projecting and reproducing apparatus and the corrected sound record and the moving picture will be properly synchronized.

Having described my invention, what I claim is:

1. The method of producing standard synchronized exhibitional moving picture and sound records from unsynchronized original records comprising reproducing visual pictures and audible sounds from said original records, adjusting the relation between the picture reproducing device and the sound pick-up device to obtain synchronism, and reproducing a new record from the original record and utilizing said adjustment to cause the reproduced record to maintain a constant predetermined standard synchronized relation between the picture record and the sound record.

2. The method of producing standard synchronized moving pictures and sound records from original unsynchronized moving picture and sound records, said method comprising reproducing the unsynchronized moving pictures and sound records, and adjusting the relation between the moving picture reproducing apparatus and the sound reproducing apparatus to obtain synchronism between the said unsynchronized moving pictures and the sound record, and utilizing said adjustment to apply corrections to produce a corrected record.

3. The method of producing synchronized records of moving pictures and corresponding sounds from unsynchronized records, comprising reproducing the unsynchronized moving pictures and sound records, adjusting the reproducing apparatus to produce synchronized reproduction, and making a corrected standard record in which the adjustment automatically applies the necessary corrections so that the synchronism between the moving pictures and the corrected sound record is produced on standardized records.

4. An apparatus for producing synchronized moving pictures and corresponding sound records from original unsynchronized records, comprising devices to visualize the moving picture record, means to reproduce sound from the sound record, adjustment devices to adjust the relationship between the visualized moving picture and the reproduced sound to obtain synchronism between said reproductions, and mechanism to simultaneously produce a second record while the original records are being operated, said mechanism comprising devices connected to said adjustment devices to automatically apply the effect of the adjustment devices to correct the said second record, whereby synchronism of the second record is constant throughout.

5. An apparatus for producing synchronized moving picture and sound records from unsynchronized moving picture and sound records comprising an exhibitor for observing the unsynchronized moving picture record, and a sound reproducer for rendering audible the unsynchronized sound record, means to adjust the relation between said exhibitor and said reproducer to obtain synchronism from said unsynchronized records, recording devices operated in synchronism with said exhibitor and said reproducer, and means to automatically apply the adjusted correction to said recording devices, whereby a corrected standard record is produced by said recording devices.

6. An apparatus for producing synchronized exhibitional records of moving pictures and sound from unsynchronized records of moving pictures and sound, said apparatus comprising an exhibitor for said moving pictures, a reproducer for said sound record, said exhibitor and said reproducer being relatively movable to determine the necessary correction between the sound record and the moving pictures to produce synchronization on a standard record, a recording device, power means operatively connecting said exhibitor and said recording device, and means under control of the operator to apply the proper correction to the recording device.

7. The method of producing a synchronized moving picture and sound record on a single film from an original non-synchronized negative film carrying moving pictures and a sound record, which comprises producing a positive from the original non-synchronized negative, reproducing moving pictures and sound in synchronized relation from said non-synchronized positive to determine the necessary adjustment to produce a standard synchronized record, and varying the position of the picture record and sound record of the original negative film relative to the positive film according to said necessary adjustment during successive printing operations to produce a standard record.

8. The method of making a synchronized moving picture and sound record from unsynchronized records, comprising maintaining synchronization between the unsynchronized moving picture and sound record, reproducing moving pictures and sound from said unsynchronized record, and making a corrected record from said unsynchronized records while the same are reproduced in synchronism.

9. The method of producing standard synchronized moving picture and sound film from an unsynchronized original negative comprising producing an unsynchronized positive from the unsynchronized negative, reproducing sound and moving pictures from the unsynchronized positive, adjusting the relation between the projected pictures and the reproduced sound to obtain synchronism, and utilizing said adjustment to produce a standard synchronized picture and sound negative from said unsynchronized positive.

GEORGE RAMSEY.